United States Patent [19]

Thieux

[11] Patent Number: 4,609,157

[45] Date of Patent: Sep. 2, 1986

[54] MACHINE FOR SHREDDING WASTE

[75] Inventor: Jean Thieux, Louveciennes, France

[73] Assignee: Compagnie Clayton, Beauchamp, France

[21] Appl. No.: 602,110

[22] Filed: Apr. 19, 1984

[30] Foreign Application Priority Data

Apr. 20, 1983 [FR] France .................. 83 06526

[51] Int. Cl.⁴ .......................................... B02C 23/10
[52] U.S. Cl. ..................... 241/243; 241/73; 241/285 R; 241/285 B
[58] Field of Search .............. 241/73, 79, 242, 243, 241/285 R, 285 A, 285 B, 101.7, DIG. 14

[56] References Cited

U.S. PATENT DOCUMENTS

| 213,471 | 3/1879 | Toufflin | 241/DIG. 14 |
| 1,801,604 | 4/1931 | Jamison | 241/285 B X |
| 4,002,302 | 1/1977 | Miller | 241/285 B X |
| 4,385,732 | 5/1983 | Williams | 241/243 X |

FOREIGN PATENT DOCUMENTS 26062 2/1977 Japan .................. 241/285 B

Primary Examiner—Mark Rosenbaum
Assistant Examiner—Timothy V. Eley
Attorney, Agent, or Firm—Bachman & LaPointe

[57] ABSTRACT

A machine for shredding material comprises a base, a shredder body selectively rotatably mounted on said base, and hinges associated with the shredder body and adjustable between a first position and a second position for selectively securing the shredder body to the base wherein the shredder body is fixed to the base when the hinges are in the first position and the shredder body is free to rotate in the base when the hinges are in the second position. The shredder body is provided with static counter-blades. A shredder rotor is rotatably mounted within the shredder body for rotation relative to the shredder body when the hinges for securing the shredder body in place are in the first position. The shredder rotor is provided with cutting blades which cooperate with the counter-blades on the shredder body when the shredder rotor rotates relative to the shredder body for shredding the material.

10 Claims, 4 Drawing Figures

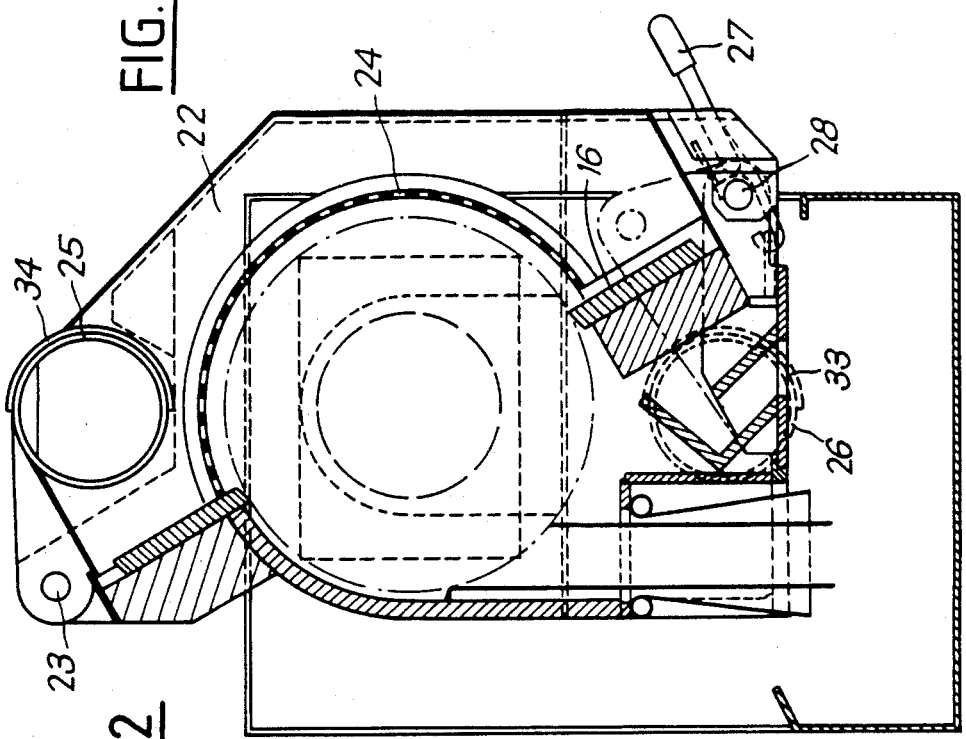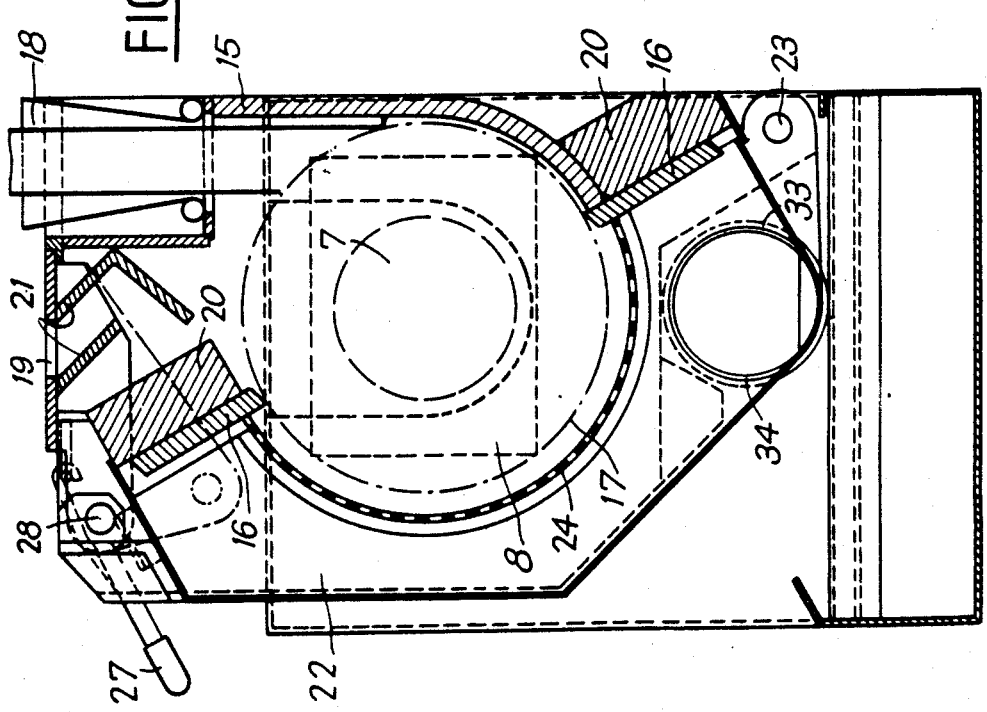

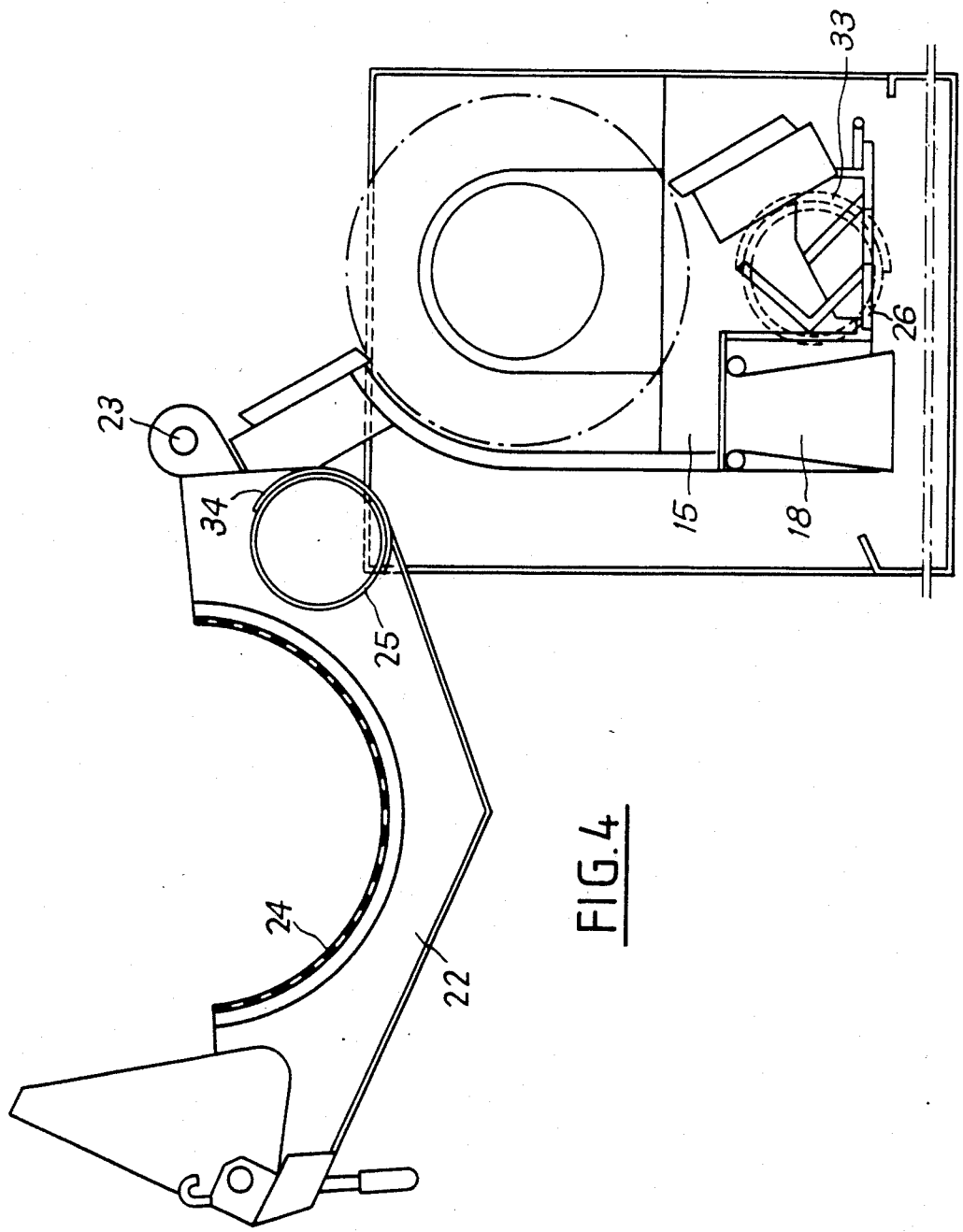

MACHINE FOR SHREDDING WASTE

BACKGROUND OF THE INVENTION

This invention relates to a machine for shredding recovered waste, especially, residues of plastics material. A machine of this kind comprises a base, a shredder body mounted on the base and provided with fixed counterblades, and a rotor provided with cutting blades and mounted for rotation about a generally horizontal axis in the body. This machine receives products to be shredded through an inlet chute and the shredded products pass through a calibration grid to fall into an outlet chute which is connected to an outlet device, such as a conduit connected to suction apparatus.

Because of their difficult operating conditions and the quality of the shredded material, it is necessary to perform frequently the cleaning and maintenance of these machines; to do this, it is necessary to obtain access easily to the calibration grid and to the blades and counterblades which have to be adjusted and changed frequently.

In certain cases, the body comprises an upper hood bearing the inlet chute and a lower part bearing the grid, these two parts being mounted pivotingly about an axis parallel to the rotor axis so as to enable access to the interior of the body for cleaning and maintenance. This arrangement increases substantially the overall size of the shredding machine which is particularly inconvenient when the shredding machine is used in combination with moulding machines. In addition, the lower part of the body is very close to the ground which offers poor working conditions and consequently an increase in the time taken for maintenance and cleaning.

The object of the present invention is to provide a shredding machine of the type as aforesaid wherein the overall size for a given capacity is reduced, and whose cleaning and maintenance are facilitated.

SUMMARY OF THE INVENTION

The present invention provides a machine for shredding material comprising a base, a shredder body comprising static counter-blades and a shredder rotor comprising cutting blades mounted for rotation in said body to cooperate with said counter-blades, said shredder body being mounted for rotation about the rotor axis whereby to present the bottom of said body for access.

In this way, by rotating the shredder body about the rotor axis, the access to the bottom of the body is facilitated and in particular, the interior can be arranged for access through the bottom of the body when it is uppermost. Moreover, it is no longer necessary to provide room underneath the body for access nor for the movement of any hinged part provided which enables the overall size of the machine to be reduced, especially its height.

In a preferred embodiment of the invention, said bottom of said shredder body comprises a part which is hinged about an axis parallel to the rotor axis and adjacent to the rotor whereby to access the interior of said shredder body. Since the body itself can be rotated, it is no longer necessary for the hinge, in particular the grid support hinge axis, to be remote from the rotor, and this enables a larger opening of the shredder body bottom and the grid support, with reduced size of the hinged part.

Preferably, the machine includes locking means for locking said shredder body against rotation relative to said base.

BRIEF DESCRIPTION OF THE DRAWINGS

Other features and advantages of the invention will appear from the following description, given by way of example with reference to the accompanying drawings in which:

FIG. 2 is a sectional view of the machine, taken on line II—II in FIG. 1;

FIG. 3 is a sectional view similar to FIG. 2 after rotation of the body of the machine; and FIG. 4 is a diagrammatic view similar to FIG. 3 with the hinged bottom part of the body opened.

DETAILED DESCRIPTION

Figure 1:
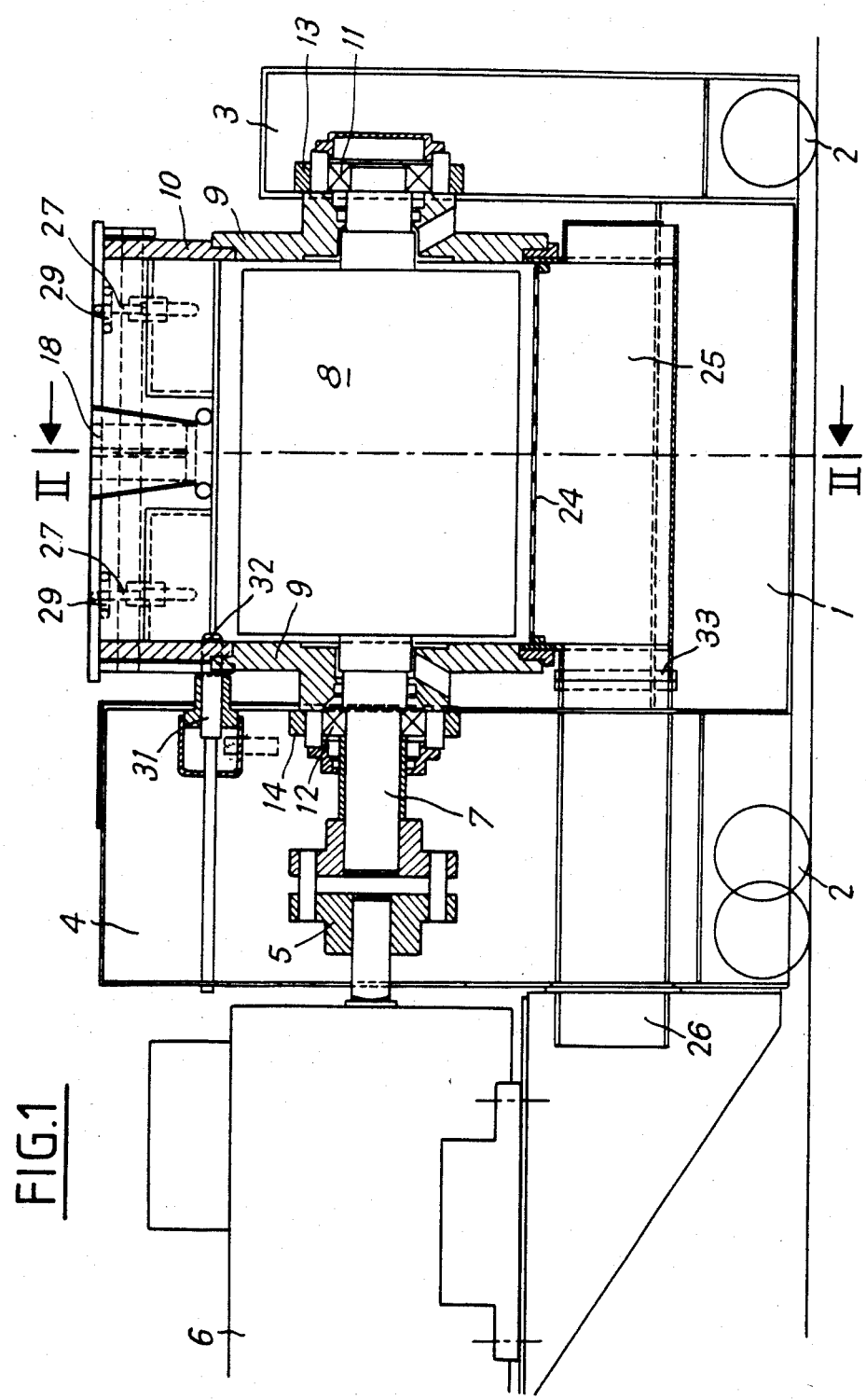
FIG. 1 is a sectional view of a shredding machine in accordance with the present invention.

The shredding machine shown in FIGS. 1 to 4 comprises a base 1 mounted on wheels 2 and comprising essentially two vertical uprights or checks 3 and 4; the upright 4 contains a coupling device 5 connected to a direct drive motor 6 which drives a shaft 7 of a rotor 8 mounted to rotate about a horizontal axis in a body indicated generally at 10.

In this embodiment of the invention, the shaft 7 of the rotor 8 is supported by bearings 11 and 12 which are supported in respective blocks 9 on the uprights 3 and 4.

Moreover, the blocks 9 are mounted to rotate about the same axis as the rotor 8 in the base 1 by means of smooth sheaves 13 and 14. It follows that the rotor 8 and the body 10 can turn relative to the base 1 coaxially and independently.

The body 10 comprises essentially an upper fixed pad 15 on which are fixed counter-blades 16 which cooperate with moving blades (not shown) mounted on the rotor 8, and whose path of movement is shown by the circle 17. This upper fixed part comprises a feed chute 18. In the embodiment illustrated, which is that of a machine for recovery of hot purges, the upper part 15 comprises a further aperture 19 which serves for the introduction of air to obtain a turbine effect, this air inlet 19 being protected against obstruction by the material to be shredded by a labyrinth 21.

The body 10 comprises a hinged bottom part 22 which can be rotated about an axis 23 parallel to the axis 7 of the rotor and disposed fairly close thereto. The hinged bottom part serves as support for the calibrating grid 24 which opens through an outlet chute 25 of circular shape connected to an outlet conduit 26 fixed in the upright 4 of the base 1 and which, for example, is connected to a suction device (not shown).

The hinged bottom part 22 is locked to the fixed upper part 15 by means of two hooks 27 hinged on a shaft 28 solid with the hinged bottom part 22 and cooperating with a rod 29 solid with the fixed upper part 15.

In addition, the body 10 is locked relative to the base 1 in its operating position by means of a locking device comprising a fixed blot 31 mounted slidingly parallel to the shaft 7 of the rotor 8 in the upright 4 of the base 1 and cooperating with a socket 32 formed in the body 10.

The blocks 9 serving for the rotation of the body 10 relative to the uprights 3 and 4 of the base 1 do not have to bear high stresses, since this rotation is manual and is performed at low speed, and therefore they comprise simple sheave bearings 13 and 14.

The outlet chute 25 and outlet conduit 26 are connected sealingly so as to reduce as far as possible loss of the vacuum produced by the suction device associated with the conduit 26. It is useful for the seal to be readily removable since the chute 25 and conduit 26 must separate when the body 10 rotates. Advantageously, the seal is obtained by two half flanges 33 and 34 each extending half way round the junction between the chute 25 and the conduit 26. The first half flange 33 is fixed to the end of the conduit 26 and the second half flange 34 is fixed to the end of the outlet chute 25. In this way, when the chute 25 and the conduit 26 are aligned in the operating position of the machine, the two half flanges 33 and 34 form together a complete flange which seals the junction of the chute 25 and the conduit 26.

The rotation of the body 10 on the base 1 is obtained by the two blocks 9 disposed at each end of the body 10, one adjacent the upright 3 and the other adjacent the upright 4; these two blocks are solid with the body 10 and are connected with the uprights 3 and 4 through the smooth sheaves 13 and 14. The shaft 7 of the rotor rotates freely in the bearings 11 and 12 mounted in the blocks 9.

The operation of the shredding machine described above is as follows. In the operating position, the bolt 31 is engaged in the socket 32 which locks the body 10 solidly to the base 1 and the hooks 27 engage the rods 29 and trapped thereon by an overcentre action about the shaft 28.

When the shredding machine is to be maintained or cleaned, it is stopped and the bolt 31 slid out of the socket 32 to enable the body 10 to rotate relative to the base 1. The body is then in the position shown in FIG. 3, the chute 25 and the conduit 26 being separated, the body having rotated through 180° for example.

It is then possible to unlock the hooks 27 and open the hinged bottom part 22 as shown in FIG. 4. It will be appreciated that easy access is then gained to the calibrating grid and also the interior of the body 10, for example in order to inspect and change the counter-blades 16 and the rotor blades. The operator can perform these operations standing up and the operations are corespondingly rapid.

This arrangement offers very ready accessibility to the different active members of the shredding machine for cleaning and maintenance. The hinged bottom part extending over practically a semi-circle about the body 10, it is possible to dispose the counter-blades 16 in any desired operating position; thus, in the embodiment shown, the counter-blades 16 are disposed in a plane which is slightly inclined to the vertical, whereas they are usually disposed in a horizontal plane in a prior shredding machine.

In the shredder according to this embodiment of the invention, all parts to which access is required (grid, rotor blades and counter-blades) can be accessed simultaneously by opening the movable part 22 whereas in prior machines it was necessary to provide two opening parts.

In addition, the arrangement of the counter-blades in the zone where the fixed and hinged parts are connected enables the grid area to be increased. Thus, in prior machines, the counter-blades are accessed from the hood at the top and the blade supports 20 on which the counter-blades are fixed are disposed underneath. In the present embodiment, the blade supports can be disposed above the blades which enables the grid area to be increased by the thickness of the two blade supports.

The above description has been given by way of example only and is not restrictive; it is clear that modifications and variants may be made within the scope of the present invention. In particular, the invention has been described with reference to a particular shredding machine for recovering hot purges, but it is clear that the invention may be applied to other machines for shredding waste product.

Because of the simplicity of the design, the invention enables very different types of shredder machines to be produced; in particular, the supply can be achieved at any desired level in the machine.

I claim:

1. A machine for shredding material comprising a base and a shredder body selectively rotatably mounted on said base, securing means associated with said shredder body and said base and adjustable between a first position and a second position for selectively securing said shredder body to said base wherein said shredder body is fixed to said base when said securing means is in said first position and said shredder body is free to rotate in said base when said securing means is in said second position, static counter-blades provided on said shredder body, a shredder rotor rotatably mounted within said shredder body wherein said shredder rotor rotates relative to said shredder body when said securing means is in said first position and wherein said shredder body rotates in said base coaxial to said shredder rotor when said securing means is in said second position, said shredder rotor being provided with cutting blades for cooperating with said counter-blades on said shredder body when said shredder rotor rotates relative to said shredder body when said securing means is in said first position.

2. A machine according to claim 1 wherein said shredder body is mounted on bearings provided on said base.

3. A machine according to claim 2 wherein said shredder rotor is mounted on a shaft which passes through said bearings on which said shredder body is mounted.

4. A machine according to claim 1 wherein said shredder body is provided with a hinged part for gaining access into the interior of said shredder body.

5. A machine according to claim 4 wherein the counter-blades are mounted on said shredder body in an area adjacent to said hinged part.

6. A machine according to claim 4 wherein said hinged part is in the form of a semi-circle.

7. A machine according to claim 4 including locking means for locking said hinged part to said body.

8. A machine according to claim 1 including an outlet chute formed in said shredder body and an outlet conduit cooperating with said outlet chute and formed in said base wherein said outlet chute and said outlet conduit are aligned when said securing means is in said first position.

9. A machine according to claim 8 wherein sealing means are provided for sealing the junction between said outlet chute and said conduit.

10. A machine according to claim 9 wherein said sealing means comprises a first flange part mounted on said outlet chute and a second flange part mounted on said conduit, said flange parts cooperating when said chute and said conduit are aligned to seal the junction therebetween.

* * * * *